(12) United States Patent
Pionetti et al.

(10) Patent No.: US 9,476,521 B2
(45) Date of Patent: Oct. 25, 2016

(54) METHOD FOR LAYING A SUBMARINE LINE ON THE SEABED

(75) Inventors: François-Régis Pionetti, La Baleine (FR); Damien Szyszka, Issy les Moulineaux (FR); Hubert Cheverry, Rambouillet (FR)

(73) Assignee: SAIPEM S.A., Montigny le Bretonneux (FR)

( * ) Notice: Subject to any disclaimer, the term of this patent is extended or adjusted under 35 U.S.C. 154(b) by 944 days.

(21) Appl. No.: 13/635,179

(22) PCT Filed: Jan. 28, 2011

(86) PCT No.: PCT/FR2011/050177
§ 371 (c)(1),
(2), (4) Date: Sep. 14, 2012

(87) PCT Pub. No.: WO2011/114027
PCT Pub. Date: Sep. 22, 2011

(65) Prior Publication Data
US 2013/0004240 A1    Jan. 3, 2013

(30) Foreign Application Priority Data
Mar. 18, 2010   (FR) ..................................... 10 51937

(51) Int. Cl.
    *F16L 1/19*     (2006.01)
    *F16L 1/235*    (2006.01)
    *F16L 1/20*     (2006.01)

(52) U.S. Cl.
    CPC .................. *F16L 1/235* (2013.01); *F16L 1/19* (2013.01); *F16L 1/201* (2013.01)

(58) Field of Classification Search
    CPC ............. F16L 1/235; F16L 1/23; F16L 1/26; F16L 55/46

USPC ...... 405/158, 161, 166, 168.1, 168.4, 168.2, 405/169, 170; 72/369, 394, 367, 380, 318, 72/210
See application file for complete search history.

(56) References Cited

U.S. PATENT DOCUMENTS 1,220,187 A * 3/1917 Chapman .................. F16L 1/19
                                                    405/166
1,393,943 A * 10/1921 Chapman ................ F16L 1/161
                                                    405/166

(Continued)

FOREIGN PATENT DOCUMENTS

FR            2916795         12/2008

*Primary Examiner* — Benjamin Fiorello
*Assistant Examiner* — Edwin Toledo-Duran
(74) *Attorney, Agent, or Firm* — Cozen O'Connor

(57) ABSTRACT

A method of laying an undersea line at the bottom of the sea from the surface to connect the bottom end thereof to a coupling element at the sea bottom by positioning the undersea line suspended from the surface in a substantially vertical position and including a curving device extending between two points and having at least one cable and tensioning means for tensioning the cable suitable for reducing the length of the cable extending between the two fastening or guide points from a maximum length L0 to a given shorter limit value L1; moving the bottom end of the undersea line in such a manner as to move the bottom end of the undersea line away from its initial position through a distance D, if necessary, moving the undersea line closer to the sea bottom while simultaneously lowering the line additionally from the surface, and then finalizing the positioning and connecting of the bottom end of the line to the sea bottom.

15 Claims, 8 Drawing Sheets

(56) References Cited

U.S. PATENT DOCUMENTS

| | | | | |
|---|---|---|---|---|
| 1,569,764 | A * | 1/1926 | Lockwood | F16L 1/161 405/166 |
| 2,215,460 | A * | 9/1940 | Childress | B63B 35/04 193/35 R |
| 2,931,185 | A * | 4/1960 | Ashey | B63B 35/04 226/114 |
| 3,266,256 | A * | 8/1966 | Postlewaite | F16L 1/19 405/166 |
| 3,462,963 | A * | 8/1969 | Moore | E02F 3/9218 37/317 |
| 3,472,034 | A * | 10/1969 | Lawrence | F16L 1/19 405/166 |
| 3,491,541 | A * | 1/1970 | Berard | F16L 1/23 405/166 |
| 3,508,409 | A * | 4/1970 | Cargile, Jr. | E02B 17/00 166/354 |
| 3,581,506 | A * | 6/1971 | Howard | F16L 1/19 173/196 |
| 3,585,806 | A * | 6/1971 | Lawrence | F16L 1/202 405/166 |
| 3,589,136 | A * | 6/1971 | Sorenson | F16L 1/18 405/166 |
| 3,670,511 | A * | 6/1972 | Gibson | B63B 35/03 405/166 |
| 3,680,322 | A * | 8/1972 | Nolan, Jr. | F16L 1/19 405/166 |
| 3,685,305 | A * | 8/1972 | Lloyd, III | B63B 35/03 114/265 |
| 3,698,199 | A * | 10/1972 | Matthews, Jr. | F16L 1/15 166/345 |
| 3,736,760 | A * | 6/1973 | Carstens | F16L 1/225 405/166 |
| 3,739,590 | A * | 6/1973 | Whitfield, Jr. | F16L 1/225 114/150 |
| 3,822,559 | A * | 7/1974 | Matthews, Jr. | F16L 1/225 226/106 |
| 3,884,043 | A * | 5/1975 | Timmermans | B63B 35/03 114/231 |
| 3,901,043 | A * | 8/1975 | Silvestri | F16L 1/225 16/357 |
| 3,922,870 | A * | 12/1975 | Recalde | B63B 35/03 16/267 |
| 3,924,415 | A * | 12/1975 | Goren | B63B 35/03 405/166 |
| 3,955,599 | A * | 5/1976 | Walker | B21D 7/10 138/103 |
| RE28,922 | E * | 8/1976 | Lloyd, III | B63B 35/03 114/264 |
| 4,065,822 | A * | 1/1978 | Wilbourn | B63B 22/021 114/230.22 |
| 5,380,129 | A * | 1/1995 | Maloberti | F16L 1/16 405/158 |
| 5,533,834 | A * | 7/1996 | Recalde | F16L 1/202 405/166 |
| 5,797,702 | A * | 8/1998 | Drost | F16L 1/163 405/166 |
| 6,213,686 | B1 * | 4/2001 | Baugh | F16L 1/19 405/158 |
| 6,461,083 | B1 * | 10/2002 | Pionetti | E21B 17/015 166/350 |
| 6,715,963 | B2 * | 4/2004 | Kuppers | F16L 1/18 405/166 |
| 6,733,208 | B2 * | 5/2004 | Stockstill | B63B 35/03 405/166 |
| 2002/0006314 | A1 * | 1/2002 | Willis | F16L 1/20 405/168.2 |

* cited by examiner

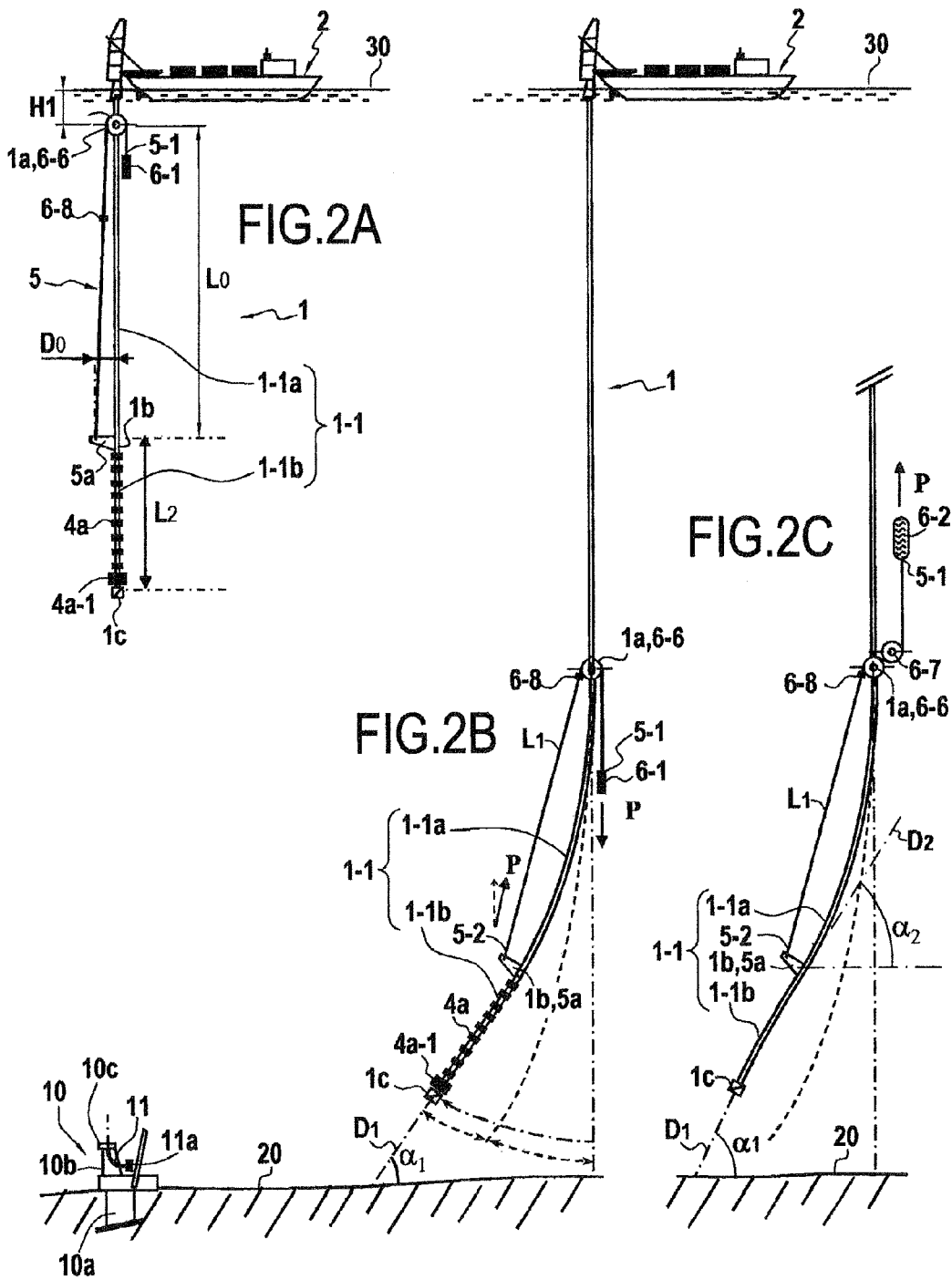

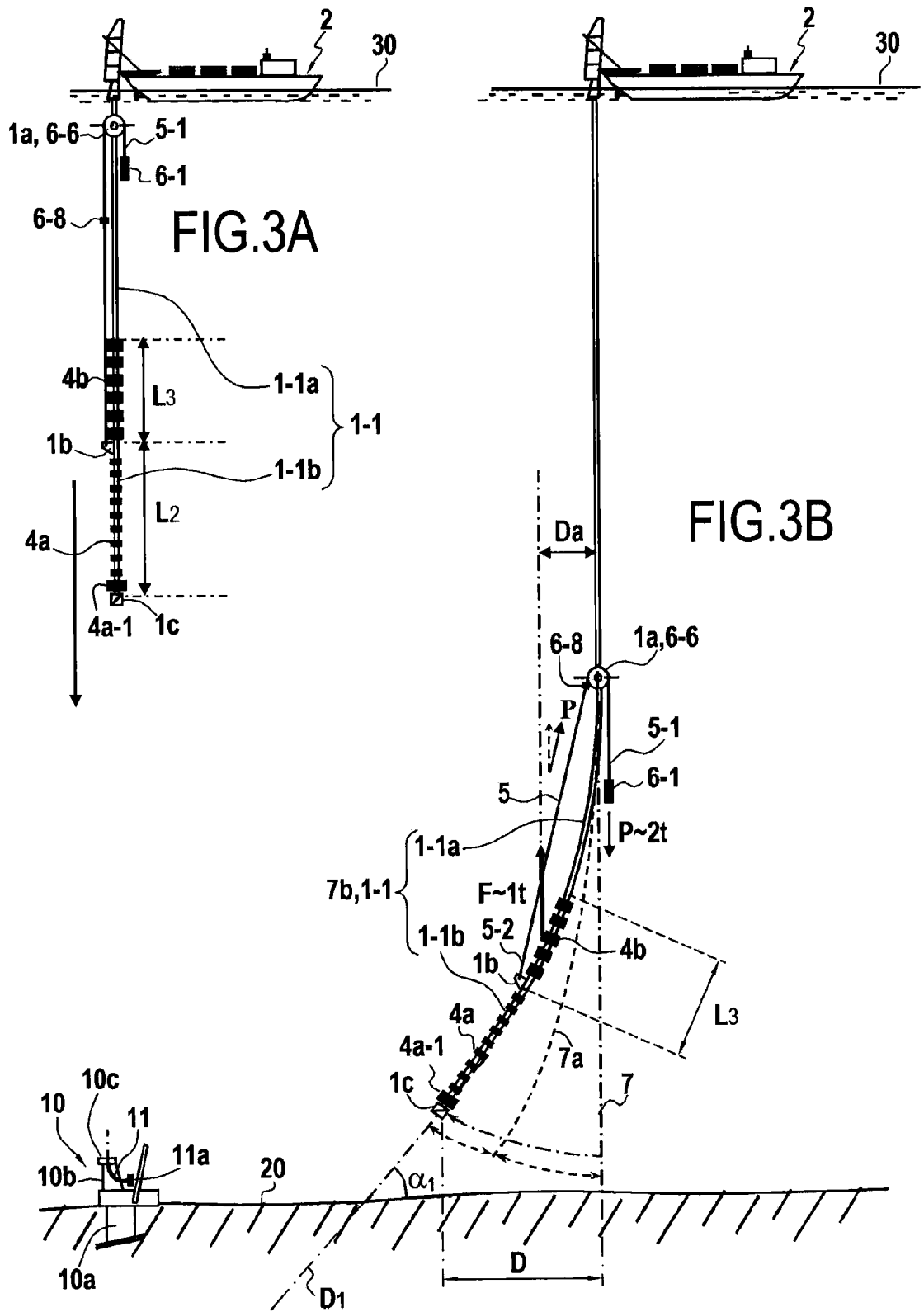

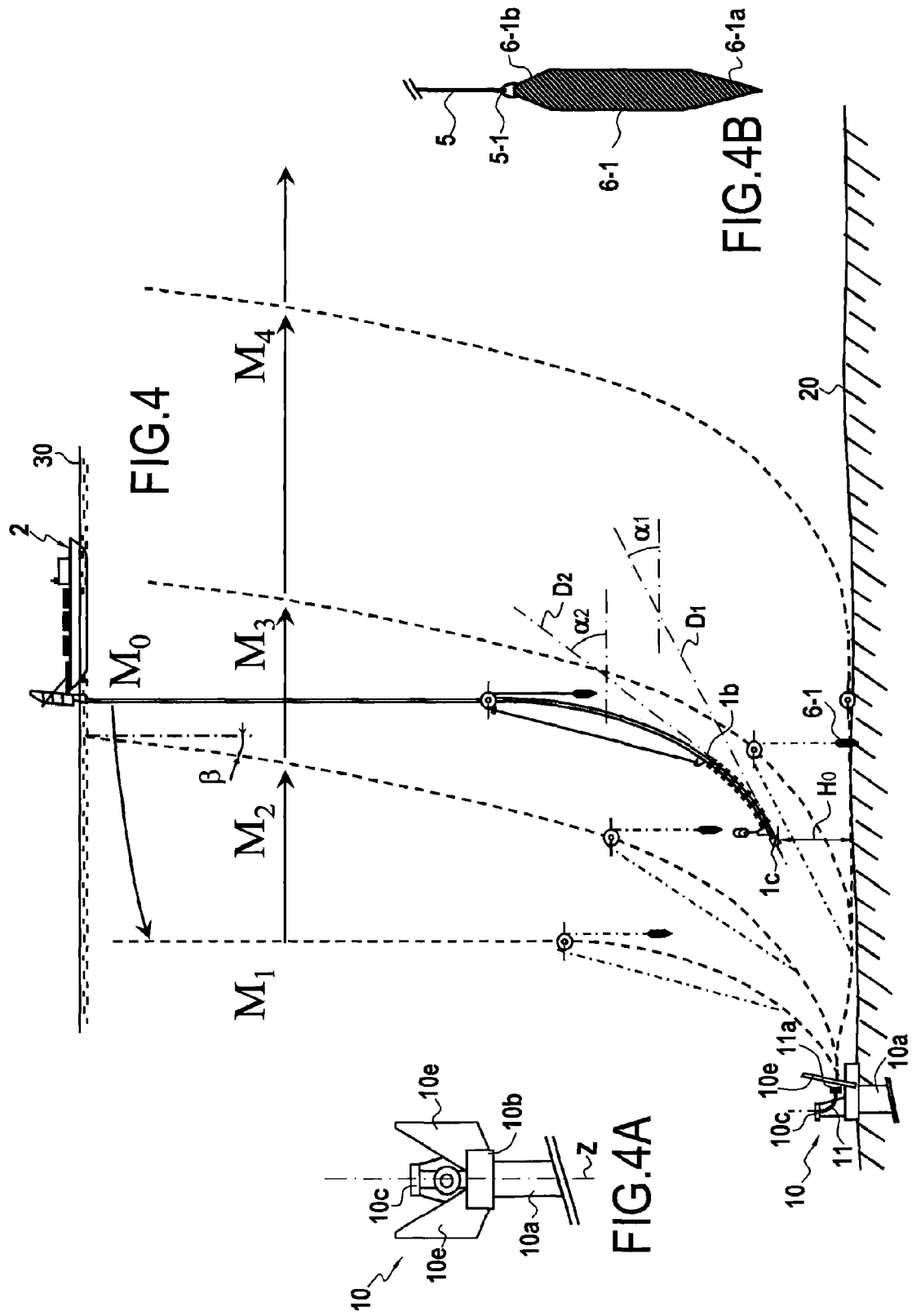

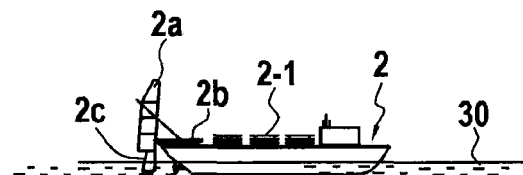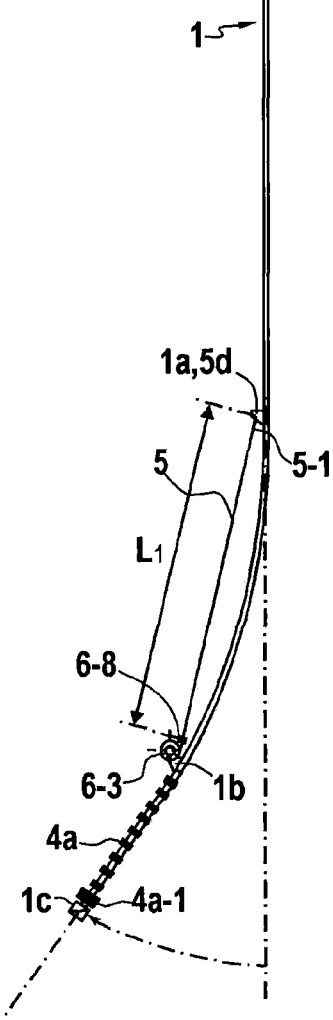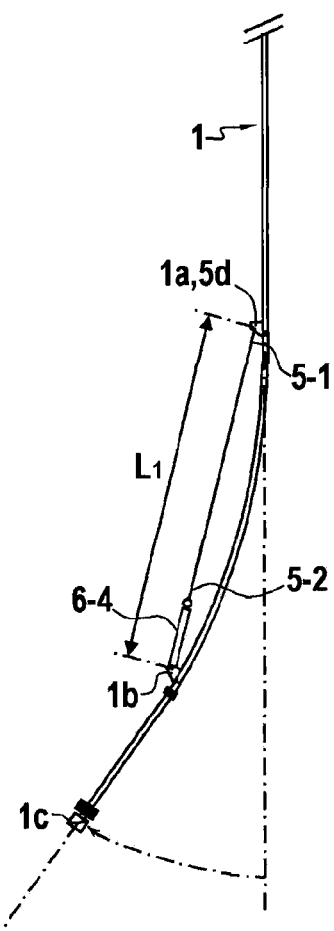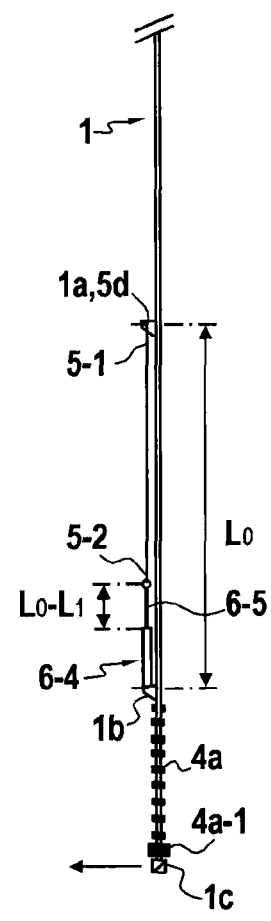
FIG.6
FIG.7A    FIG.7B

METHOD FOR LAYING A SUBMARINE LINE ON THE SEABED

RELATED APPLICATIONS

This is a U.S. national stage of application No. PCT/FR2011/050177, filed on Jan. 28, 2011. Priority is claimed on the following application: French Application No.: 10 51937 filed on Mar. 18, 2010, the content of which is incorporated here by reference.

FIELD OF THE INVENTIONS

The present invention relates to a method of laying an undersea line on the sea bottom from the surface.

The term "undersea line" is used herein to mean not only pipes that are to rest on the sea bottom, which may be flexible pipes or rigid pipes, but also electric cables and/or various umbilicals needed for operating undersea installations.

More particularly, the present invention relates to a method of laying an undersea pipe on the sea bottom from a laying ship on the surface, and more particularly an undersea pipe for providing the connection between two well heads or between a well head and a bottom-to-surface connection pipe connected to a floating support. The term "undersea pipe" is used herein to mean a pipe resting on the sea bottom or such a pipe in a vertical position suspended from the surface, in particular from a laying ship on the surface, or indeed such a pipe in which the bottom segment presents a J-shaped curve.

The term "laying" is used herein to mean laying on the sea bottom in the sense of "lowering from the surface and causing to rest on the sea bottom".

BACKGROUND OF THE INVENTION

The technical field of the invention is the field of fabricating and installing undersea production pipes for undersea extraction of oil, gas, or other soluble or fusible material, or a suspension of mineral matter, from an underwater well head in order to develop production fields installed offshore, in the open sea, or indeed undersea pipes for injecting water or gas. The main and immediate application of the invention lies in the field of oil production, and also in reinjecting water and producing or reinjecting gas.

Undersea pipes are laid in ultra-deep sea in general from a laying ship having dynamic positioning and fitted with a J-lay tower. The tower is generally in a substantially vertical position and in its bottom portion it presents a device for gripping the pipe that extends from the laying ship down to the sea bottom where the pipe becomes naturally curved in order to take up a horizontal final position when it is resting on sea bottom, the curve being J-shaped. Such a ship is described in particular in patent WO 2000/66923.

Thus, during laying, the pipe is held securely in the bottom portion of said J-lay tower, while a new string having a length of 24 meters (m) or 48 m is installed in a horizontal position on a beam that is hinged to the structure of said tower. Said beam is then raised into a substantially vertical position by means of hydraulic actuators, and then said string is lowered to the top end of the pipe that is held in suspension in order to be accurately positioned relative to the pipe and finally welded thereto. Once welding has been completed and tested, the pipe is protected against corrosion, and then the top portion of the string is held within said tower by a gripper device secured to a carriage. The retaining device at the bottom of the tower is then released and said carriage is moved towards the bottom of the tower over a height corresponding to the length of said string. Simultaneously, the ship is moved forwards through a length corresponding to the length of string that has been lowered in this way, so as to maintain the same J-shaped curve throughout the laying operation. Finally, the locking device at the bottom of the tower is relocked, and the carriage is released and raised to the top of the tower. The cycle then begins again with a new string.

When beginning to lay an undersea pipe, successive strings are assembled together until the pipe reaches a level that is situated 10 m to 20 m above the sea bottom. The pipe is then in a vertical position. Thereafter, with the help of a cable or sling, the end of said pipe is connected to a fixed point on the sea bottom, e.g. an anchor, or indeed a pile embedded in the sea bottom, with positioning being performed by an automatic undersea remotely-operated vehicle (ROV) controlled from the surface and fitted with a manipulator arm. The ship then moves forwards while continuing to assemble new strings to the pipe, and once the J-shaped curve has been achieved, the bottom end of the pipe rests on the bottom and installation progresses in continuous manner while conserving the J-shape, i.e. while causing the ship to advance through a length that corresponds exactly to the length of the string that has just been installed.

The main drawback of that method is that once the pipe is fully installed, i.e. laid on the sea bottom, the pipe and the connecting cable and its anchor are under high traction stress. As soon as the connection cable is cut or disconnected, the end of the pipe shrinks through some variable length depending on the characteristics of the sea bed and of the pipe. It is therefore necessary to prepare special junction pipes, in general of great length, in order to ensure they have sufficient flexibility, so as to be able to make the junction with a well head or with the bottom end of a bottom-to-surface connection pipe. One such junction pipe is described in particular in patent application FR 08/58214 and in international application PCT/FR2009/052298 in the name of the Applicant. Such a bottom-to-surface connection is described in particular in patent WO 00/49267 and in numerous other patents in the name of the Applicant.

In general, the end of the undersea pipe corresponding to the end of laying, i.e. the top end of the last string, needs to have such a junction pipe connected thereto. In contrast, at the end corresponding to the beginning of laying, i.e. at the bottom end of the first string at the sea bottom, it is desired to avoid adding a junction pipe by securing the end of said undersea pipe directly to an anchor structure, thereby enabling said undersea pipe end to be positioned accurately, which end is generally fitted with a (male/female) automatic connector that is thus in position ready to be connected to the end of a second pipe fitted with a complementary (female/male) portion of said automatic connector, in particular the end of a pipe bend incorporated in an anchor structure. Numerous attempts have been carried out, but they all encounter the problem of initially forming the initial J-shaped curve under good conditions of safety, where such curving must be performed under full control. In the event of a limiting amount of curvature that is associated with the size of the pipe and with the elastic limit of steel, the pipe will be irreversibly folded or kinked, and the kinking phenomenon is generally sudden and makes the already-assembled length of pipe unusable. J-laying is not a reversible method, and if the bottom end of the pipe is damaged then the entire pipe needs to be disconnected from the ship and abandoned on the sea bottom.

More particularly, and in general, the pipe is lowered vertically as closely as possible to said anchor structure, e.g. to within 3 m to 5 m, and then a sling that is short, e.g. a few meters or 5 m to 10 m long, is connected between the bottom end of the pipe and the anchor structure. Then, by moving the laying ship, while continuing to assemble additional strings to the pipe, the J-shaped curve is formed and the end of said pipe is finally laid on a support that is secured to the anchor structure, guide elements being incorporated in said support so as to direct the connector at the end of the pipe towards its final position, which final position needs to be very accurate. The main problem is that during the approach stage, when the pipe is vertical, or even when it presents the beginning of curvature, any movement of the ship on the surface is reproduced to a greater or lesser extent at the sea bottom at the bottom end of the pipe. Pounding movements are likewise transferred in full. As a result, because of the short length of the connection cable or sling, the bottom end of the pipe runs the risk at this stage of striking the support structure for receiving it, thereby damaging the automatic connector which is a mechanical component that is complex, of high precision, and extremely expensive. In the event of damage, the complete undersea pipe is, likewise lost and needs to be disconnected from the ship and abandoned on the sea bottom. In contrast, once the J-shaped curve has been properly formed, the problem is different since the pounding movements of the ship are no longer transferred directly to the end of the pipe. The major portion of the pounding gives rise to no more than variation in the curvature of the bottom portion of the pipe, mainly in the zone corresponding to the bottom of the J-shape. As a result, risks of collision are greatly reduced, or even non-existent.

In certain documents, and in particular U.S. Pat. Nos. 5,380,129 and 3,698,199, a curving device is described for curving a pipe with the help of winches and cables, said winches being mounted on board a ship or a platform standing on the sea bottom. Those curving devices are not suitable for automatically controlling the reduction in the length of the cable and thus for automatically controlling the curvature of the pipe.

In U.S. Pat. No. 4,065,822, limiting the curvature of a pipe with the help of chains extending between two points of the pipe is described, but no means are described or suggested for tensioning, controlling, and moving the curved pipe.

In U.S. Pat. No. 3,955,599, a pipe-curving device comprises a plurality of annular segments hinged to one another and through which the pipe is caused to pass, the two end segments being connected together by an actuator. A curving device of that type is suitable for creating curvature over a short length of pipe and more particularly for creating a bend between two straight pipe fractions, however such a device does not make it possible automatically to control curvature of a greater radius of curvature that results merely from moving the bottom end of the pipe. Furthermore, the curving device described in U.S. Pat. No. 3,955,599 requires mechanical components to be installed that are relatively expensive and complex to install.

SUMMARY OF THE INVENTION

Thus, the object of the present invention is to provide a novel method and device that are simpler, more reliable, and that overcome the above-described drawbacks and problems in order to install and lay undersea pipes at sea that are to rest on the sea bottom and that have their bottom ends fitted with respective automatic connectors for connection to a complementary automatic connector element of an element or a structure that is anchored to the sea bottom.

In order to do this, the present invention consists essentially in creating initial pre-curvature of the bottom segment of said undersea pipe that is being laid while it is placed in a position that is substantially vertical or slightly inclined from a J-lay tower of a laying ship, in order to enable its bottom end to be laid and positioned more accurately on the sea bottom, and in particular to be positioned accurately on a support and docking structure anchored to the sea bottom in order to connect an automatic connector at the end of said undersea pipe to a complementary automatic connector at the end of a second pipe or of a junction pipe, preferably a pipe bend that is secured to said support and guide structure anchored to the sea bottom.

More precisely, the present invention provides a method of laying an undersea line at the bottom of the sea from the surface in order to connect the bottom end thereof to a coupling element at the sea bottom, the method being characterized in that the following steps are performed:

1) said undersea line is positioned so as to be suspended from the surface in a substantially vertical position, its bottom end being situated at a height $H0$ above the sea bottom, said undersea line having in its bottom segment a curving device for curving a first portion of the undersea line extending between two points of said undersea line that are referred to as fastening or guide points, said curving device comprising at least one cable and tensioning means for tensioning said cable between said two fastening or guide points where said undersea line is secured to said cable by fastening or respectively by guidance, said tensioning means being suitable for moving said two fastening or guide points towards each other by reducing the length of the cable extending between the two said fastening or guide points from a maximum length $L0$ to a given shorter limit value $L1$, said cable or said tensioning means comprising or co-operating with at least one blocking means suitable for preventing the reduction in the length of the cable tensioned between said two fastening or guide points below a said given shorter limit value $L1$, said two fastening or guide points being spaced apart by a maximum length $L0$ when said first undersea line portion is in a rectilinear position; and 2) the bottom end of said undersea line is moved, preferably with the help of a controlled undersea robot more preferably of the ROV type, so that the bottom end of said undersea line moves away from its initial position of step 1) in which said line was in a vertical position, said tensioning means creating controlled curvature of said first undersea line portion by moving said two fastening or guide points towards each other, said curvature of the first undersea line portion being limited as the result of the reduction in the length of the chord formed by the tensioned cable between said two fastening or guide points being incapable of going below said given shorter limit value $L1$; and 3) if necessary, moving said undersea line, having its first portion including a said curved shape, closer to the sea bottom by lowering an additional length of said line from the surface; and then 4) the positioning of said bottom end of the line is finalized relative to said coupling element at the sea bottom, and the bottom end of said line is connected to said coupling element.

It can be understood that:

in step 1), said tensioning means are suitable for moving said two fastening and guide points towards each other when the bottom end of the undersea line is moved; and in step 2), said tensioning means are actuated automatically so as to create said controlled curvature when the bottom end of the undersea line is moved as described above.

More particularly, each of said two fastening or guide points is:
- either a fastening point to which one end of the cable or a said tensioning means is fastened on said undersea line, said end of the cable being fastened to said line directly or via a said tensioning means;
- or else, respectively, a guide point for guiding the cable on said line, the end of said cable closer to said guide point being fastened to a said tensioning means.

The method of the invention makes it possible to preshape the bottom segment of the undersea line so as to have predefined curvature in order to make it easier to perform said laying and connection to a coupling element at the sea bottom, since said curvature makes it possible to reduce very greatly the transmission of pounding movements from the laying ship at the surface to the bottom end of said undersea line, thereby reducing the risk of impacts and damage to said coupling element at the sea bottom and to the bottom end of said line. Laying and connecting the undersea line to the sea bottom are also made easier because the terminal portion between the bottom end of the line and said curved first line portion is not under tension, such that it can be moved relatively easily, in particular during steps 3) and 4) of the method.

In step 2), it can be understood that:
- said tensioning elements are at least suitable for overcoming the stiffness of said line in order to give rise to said curvature; and
- the chord formed by the cable relative to the arc constituted by the curved undersea line portion between the two fastening and guide points presents a length that decreases down to the limit value L1 progressively as the curvature of the arc is increased as is the distance D between said pipe bottom end and its initial position from step 1) when said line was in the vertical position.

More particularly, said tensioning means comprise at least one of the three following tensioning means:

a) a deadman or a buoyancy element fastened or connected to one end of said cable, said cable then being guided between its two ends by guide means secured to said line at one of said fastening or guide points that is a point for guiding said cable on said line, the other end of said cable being fastened or connected to the other fastening or guide point, which is a fastening point, and said cable preferably including a said blocking means constituted by a blocking cleat secured to the cable, said blocking cleat not being capable of passing through at least one of said guide means; and b) a winch fastened or connected to the undersea line at at least one of said two fastening or guide points, on which winch said cable can be wound from at least one of its ends whereby it is fastened to the winch, and said cable preferably including a said blocking means constituted by a blocking cleat secured to the cable and preventing additional cable being wound around said winch; and c) an actuator fastened or connected to the undersea line at at least one of said two fastening or guide points, the actuator having an actuator rod having one end fastened or connected to at least one end of said cable, said actuator rod preferably being incapable of moving through more than a maximum distance equal to L0−L1.

More particularly, said winch or said actuator may be fastened on said undersea line at a said fastening point, or said winch or actuator may be fastened other than on said line, in which case it is connected by said cable to a said guide point for the cable on said line.

When said tensioning means is a winch or an actuator, having one end of the cable fastened thereto, the other end of the cable is preferably fastened or connected to a said fastening point.

Still more particularly, the method includes the characteristics whereby:
- said cable is fastened at one end to a gusset secured to said line at a said fastening point defining said first portion and the terminal portion of the bottom segment of the undersea line, and said cable passes between its two ends via cable guide means secured to said undersea line at a guide point on said undersea line, the other end of said cable co-operating with tensioning elements comprising a buoyancy element or a weight or deadman, exerting a tension of magnitude P at said other end; and
- in step 2), the bottom end of said undersea line is moved so as to create controlled curvature of the first undersea line portion lying between said fastening point on the line and said guide point on the line as a result:
  - said tensioning elements exert a tension P of magnitude suitable for tensioning said cable and for curving said first undersea line portion when the bottom end of said undersea line is moved away from its initial position of step 1) in which said line was in a vertical position; and
  - said cable includes or co-operates with blocking means preventing the length of said chord formed by the cable tensioned between the fastening point and said guide point decreasing below a given limit value of length L1, thereby limiting the curvature of said first line portion between the fastening point and said guide point as a result of said tensioning.

It can be understood that said fastening point is situated at a distance L2 from the bottom end of the undersea line when the terminal portion of the undersea line extending between said bottom end and said fastening point on the line is rectilinear.

It can be understood that said guide point is situated at a distance L0 from said fastening point when the first portion of the undersea line extending between said guide point and said fastening point is rectilinear.

In a preferred implementation, the method of the invention comprises the following characteristics:
- said undersea line is an undersea pipe of steel made up of strings assembled to one another by end-to-end welding while in position in a laying tower of a laying ship at the surface, from which said undersea pipe is laid on the sea bottom; and
- in step 2), the bottom end of said undersea line is moved with the help of a controlled undersea robot, more preferably of the ROV type; and
- said curvature of said first undersea pipe portion between the two said fastening or guide points being limited so that the radius of curvature of said pipe remains greater than a limit value corresponding to a maximum stress below the elastic limit, preferably less than 90%, more preferably less than 70% of the elastic limit of the steel of said first pipe portion, said curvature preferably being such that the angle $\alpha_2$ of the tangent D2 of the pipe at said fastening point is less than 45°, and preferably less than 30°; and
- in step 3), said undersea pipe in which said portion has a curved shape is moved by moving said laying ship closer to said coupling element on the sea bottom, if necessary while also lowering an additional length of said undersea pipe from the laying ship on the surface; and in step 4), the positioning of said bottom end of the pipe is finalized relative to said coupling element situated at the end of another pipe supported by a structure anchored to the sea bottom, and said coupling element of the automatic connector type is connected to a complementary automatic connector coupling element situated at the bottom end of said pipe.

More particularly, the minimum radius of curvature of said first undersea pipe portion between said two fastening or guide points lies in the range 200 to 650 times the outside diameter of said pipe, and preferably in the range 225 to 450 times the outside diameter of said pipe.

More particularly, the pipe comprises the characteristics whereby:

said strings are assembled by end-to-end welding two to four unit pipe elements each having a length of 5 m to 15 m, with outside pipe diameters lying in the range 50 mm to 600 mm (2 inches to 24 inches);

the length L2 of the terminal pipe portion corresponds to a length of one to ten unit pipe elements placed end-to-end in a straight line, preferably having a length L2 lying in the range 5 m to 100 m, more preferably not more than one string; and the length L0 of said first pipe portion in a rectilinear position lies in the range 150 to 1000 times, preferably 175 to 700 times the outside diameter of the pipe, corresponding to ⅕ to ½ of the depth of the undersea ground, which depth is at least 1000 m, preferably at least 1500 m, and more preferably L0 corresponds to the length of two to twenty strings placed end-to-end in a straight line, in particular L0 lies in the range 25 m to 750 m.

Still more particularly, in an implementation:

said guide means comprise at least one sheave of axis secured to said pipe; and said blocking means are constituted by a blocking cleat secured to the cable and situated at a length L1 from said fastening point when the pipe is rectilinear, preferably such that the difference in length L0−L1 is less than or equal to 25% of said length L0, and preferably less than 10% of said length L0. In practice, the length L0−L1 may more particularly lie in the range 5 m to 100 m.

In a preferred implementation, said pipe includes or co-operates with first buoyancy elements at said terminal pipe portion between a said fastening or guide point and the bottom end of the pipe in such a manner as to compensate at least the apparent weight in water of said terminal pipe portion, said first buoyancy elements preferably being uniformly distributed along said terminal portion, such that, even more preferably, the angle $\alpha_1$ of the tangent D1 to said pipe at its bottom end is less than 45°, and more preferably less than 30°.

These buoyancy elements make it easier for the rod to manipulate said bottom pipe segment and move the bottom pipe end in steps 2) and 3), and they make it possible to use a tensioning element, if any, creating a reduced tension of magnitude P.

In a preferred implementation, said pipe includes or co-operates with first buoyancy elements in said terminal pipe portion so as to compensate essentially only for the apparent weight in water of said terminal pipe portion and of said automatic connector.

In this implementation, said terminal pipe portion between the attachment point and the bottom end of the pipe remains in a rectilinear position insofar as said buoyancy elements are not sufficient to overcome the stiffness of the pipe and generate curvature of said terminal pipe portion.

Also preferably, said pipe further includes or co-operates with additional buoyancy elements suitable for creating positive buoyancy over a fraction of said pipe bottom segment, said positive buoyancy F not being capable on its own of causing said first pipe portion to curve in the absence of said tensioning P of the cable with the help of said tensioning means, or of increasing said curvature in the presence of said tensioning P with the help of said tensioning means.

This positive buoyancy makes it even easier to curve said bottom pipe portion and move the bottom pipe end in steps 2) to 4), also making it possible to use a tensioning element creating a reduced magnitude of tension P, and to do so without running the risk of the curvature increasing and the elastic limit stress being exceeded in spite of the fact that any increase in curvature is prevented by said blocking means.

More particularly, the pipe includes said additional buoyancy elements suitable for creating positive buoyancy distributed along a fraction of the length of said first pipe portion extending from said fastening or guide point defining said first and terminal pipe portions, said positive buoyancy not being capable on its own of generating or increasing curvature of said first pipe portion in the absence of, or respectively in the presence of, said tensioning P of the cable at said guide point.

In a variant implementation, said pipe also includes or co-operates with a second additional buoyancy element co-operating with the bottom end of the pipe and suitable for creating positive buoyancy of the terminal pipe portion in combination with first buoyancy elements extending substantially over the entire length of the terminal pipe portion, said positive buoyancy being capable on its own of generating curvature of said terminal pipe portion in such a manner that the angle $\alpha_1$ of the tangent D1 to said pipe at its bottom end 1c is preferably less than 45°, more preferably less than 30°, but said positive buoyancy is not capable on its own of generating or increasing the curvature of said first pipe portion in the absence of said tensioning P of the cable at said guide point.

In known manner, said buoyancy elements are constituted by peripheral and coaxial buoyancy elements in the form of buoys that are preferably regularly spaced apart from one another.

In an advantageous implementation, after step 4), the pipe continues to be laid on the sea bottom by performing the following additional steps:

5) progressively moving the laying ship away from said structure anchored on the sea bottom through a length greater than the length of each additional string that is lowered from the laying tower, preferably through a length equal to 150% of the length of said additional string, so as to create an angle of inclination β for the pipe at the surface that is not more than 10° relative to its previous vertical position at the end of the step 3), and then 6) continuing to lower new additional strings while simultaneously moving the ship away from said structure anchored on the sea bottom through a length substantially equal to the length of each said additional string, the strings being lowered in such a manner as to conserve a said angle of inclination β for the pipe at the surface that is substantially unchanged and not more than 10°.

This surface angle of inclination β is advantageous since it enables said suspended undersea line to adopt or to approach more easily a said curve that has the geometrical shape of a catenary, which is the curve that is adopted naturally by a pipe that is suspended from the surface once its bottom end is resting horizontally flat on the sea bottom.

This implementation is particularly advantageous in that it makes it even easier to perform the final positioning and connection of the bottom end of the pipe in steps 3) and 4).

Advantageously, in a method of the invention, a said tensioning means used is constituted by a deadman or weight fastened to one end of said cable, the bottom portion of the deadman or weight being of streamlined shape, and preferably of conical shape, so as to enable it to penetrate into the ground when, during laying of the pipe, it comes into contact therewith, and its top portion also being streamlined so as to prevent it being possible for said pipe to remain blocked on top of said deadman, which would prevent the pipe from being laid horizontally on the seabed, after said bottom portion of the deadman has penetrated into the ground.

The present invention also provides an undersea pipe including a curving device suitable for laying an undersea pipe on the sea bottom from a laying ship on the surface by means of an undersea pipe laying method of the invention, the pipe being characterized in that it includes a said curving device for curving a first undersea pipe portion extending between two said fastening or guiding points, said curving device comprising at least one cable and tensioning means for tensioning said cable between said two fastening or guide points, said cable or said tensioning means including or co-operating with at least one said blocking means, said two fastening or guide points being spaced apart by a maximum length L0 when said first line portion is in a rectilinear position.

More particularly, in a pipe of the invention, said cable is fastened at one end to a first gusset secured to said undersea pipe at a said fastening point, said fastening point being situated at a distance L2 from the bottom end of the undersea pipe when the terminal portion of the undersea pipe extending between said bottom end and said fastening point is rectilinear, and said cable passes via cable guide means secured to said undersea pipe at a guide point, said guide point being situated at a distance L0 from said fastening point when said first portion of the undersea pipe extending between said guide point and said fastening point is rectilinear, and said cable co-operating with tensioning means including a buoyancy element or a weight or deadman co-operating with the other end of said cable, and exerting thereon tension of magnitude P.

In a preferred embodiment of the pipe of the invention, the pipe includes or co-operates with buoyancy elements at its said terminal pipe portion, said buoyancy elements being constituted by peripheral and coaxial buoyancy elements in the form of buoys that are preferably regularly spaced apart from one another so as to compensate at least for the apparent weight in water of said terminal pipe portion of length L2, and preferably also buoyancy elements suitable for creating positive buoyancy over a fraction of length L3 of said first pipe portion extending from said fastening or guide point defining said terminal and first pipe portions, said positive buoyancy being incapable on its own of giving rise to or increasing the curvature of said first pipe portion in the absence or respectively in the presence of said tensioning P of the cable with the help of said tensioning means.

BRIEF DESCRIPTION OF THE DRAWINGS

Other characteristics and advantages of the present invention appear in the detailed light of embodiments described below with reference to FIGS. 1 to 8:

FIGS. 2A, 2B, and 2C are side views of an undersea pipe during a stage of starting an installation, showing a first variant of the invention as shown in FIGS. 1, and a first variant of the invention (FIG. 2C);

FIGS. 3A and 3B are side views of an undersea pipe during a stage of starting an installation, showing a second variant of the invention as shown in FIGS. 1;

FIG. 4 is a side view of the stage of starting laying the pipe in a curved configuration, with four intermediate steps M1-M4, prior to proceeding in continuous manner with ordinary laying;

FIG. 4A is a face view of a receptacle of an automatic connector secured to a pile embedded in the sea bottom;

FIG. 4B is a side view of an elongate deadman presenting a conical shape at its bottom end at its top end;

FIGS. 6, and 7A, 7B are side views of a device of the invention in which the cable is tensioned respectively by a winch (FIG. 6) and by a hydraulic actuator (FIGS. 7A, 7B)

DETAILED DESCRIPTION OF THE PRESENTLY PREFERRED EMBODIMENTS

Figures 1A, 1B:
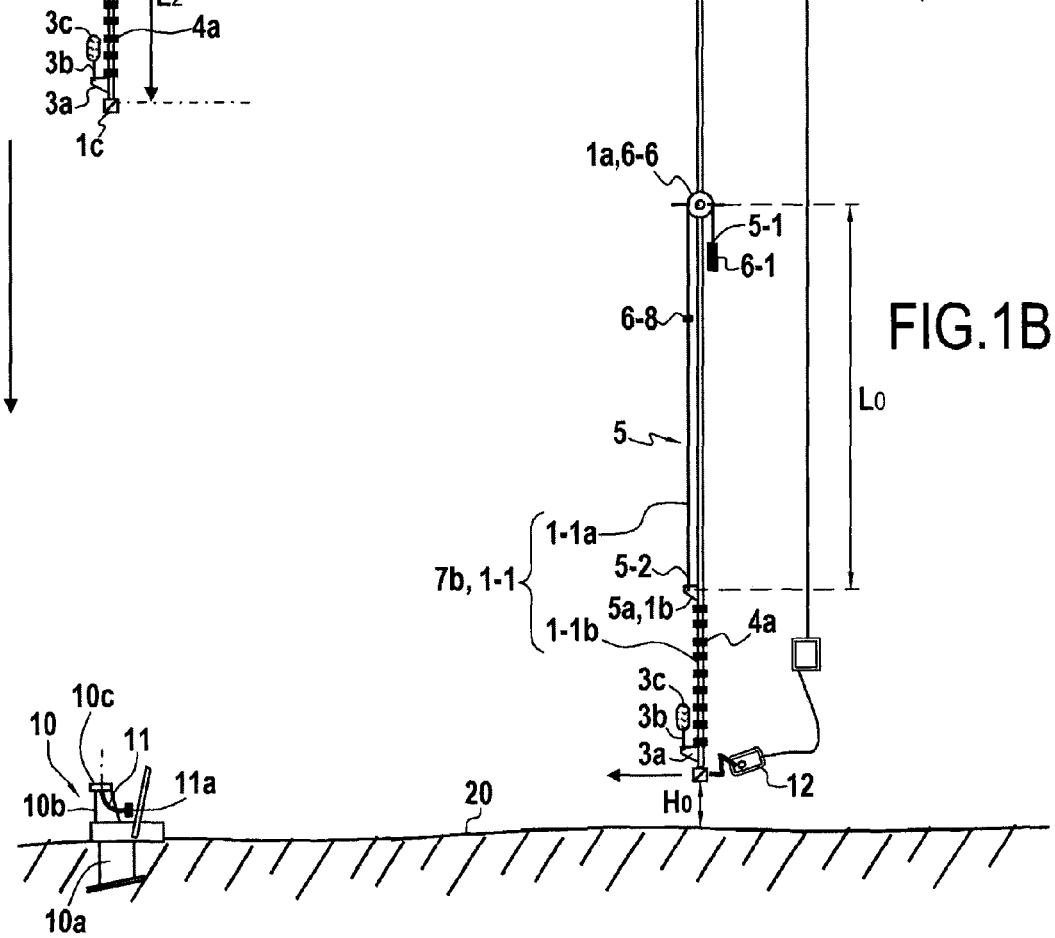
FIGS. 1A, 1B, and 1C are side views of an undersea pipe during a stage of starting installation by means of a laying ship fitted with a J-lay tower, shown respectively in a vertical configuration close to the surface, in a vertical configuration close to the sea bottom, and in a J-shaped curved configuration.

FIG. 1A is a side view of the stage of preparing the installation of a rigid undersea pipe 1 from a laying ship 2 fitted with a J-lay tower 2a. The pipe 1 is made by butt welding steel strings 2-1 in the J-lay tower. Each string 2-1 is itself made up by butt welding 6 m or 12 m long unit pipe elements. The strings 2-1 are stored on the laying ship 2 after being fabricated by assembling the unit pipe elements together on land.

Said pipe 1 is held securely in the bottom portion of said J-lay tower, and then a new string having a length 24 m or 48 m is installed in a horizontal position on a beam 2b that is hinged to the structure of said tower. Said beam 2b is then raised into a substantially vertical position by means of hydraulic actuators (not shown) and then said string is transferred to the tower and brought close to the top end of the suspended pipe, in order, finally, to be welded thereto. Once welding has been completed and tested, the pipe is protected against corrosion and then the top portion of the string is held within said tower by a gripper device secured to a carriage (not shown). The retaining device at the bottom of the tower is then opened and said carriage is moved down the tower through a distance corresponding to the length of said string. The retaining device at the bottom of the tower is then re-locked, and the carriage once released is raised to the top of the tower. The cycle then begins again with a new string.

During the stage of starting laying, various accessories as described below are installed in succession. The bottom end of the first string is fitted with a male or female portion of an automatic connector that is to constitute the bottom end 1c of the pipe. Close to said connector, a float 3c is installed that is connected to a first gusset 3a that is secured by means of a link 3b to the pipe. At a distance L2 from the automatic connector, a second gusset 5a is installed that is secured to the pipe and that has a cable 5 connected thereto, preferably made of synthetic material, with the other end 5-1 of the cable passing over a sheave 6-6 secured to the pipe at a point 1a referred to as the "guide point", and situated at a distance L0 from said second gusset 5a. Said cable 5 is placed around said sheave 6-6, with its free end 5-1 connected to a deadman 6-1, the free end 5-1 being on the side of said sheave that is opposite from the side on which the first end 5-2 is located that is connected to said second gusset 5a. A cable clamp 6-8, referred to as a "blocking cleat" is securely installed on said cable 5 to perform a function that is described in greater detail below of blocking against the inlet of the sheave 6-6 and thus blocking the cable.

Between the second gusset 5a and the first gusset 3a, the pipe is fitted with coaxial peripheral float elements 4a that compensate the apparent weight of this portion of pipe. This end portion 1-1b of the pipe is thus in buoyancy equilibrium in water, i.e. in neutral equilibrium.

The length L2 comes to 12 m to 24 m or 48 m. It therefore forms part of the first string and is advantageously prepared on board, as is the float 3c, insofar as the float is capable of passing through the base structure 2c of the J-lay tower 2a. If this is not so, the float 3c can be installed in known manner by means of an underwater automatic ROV 12 that is controlled from the surface, once the bottom end of the pipe has reached a depth of 40 m to 50 m.

The length L0 of the first pipe portion 1-1a constitutes several hundreds of meters, so the pipe is fabricated by successively assembling together strings in the J-lay tower, in the manner explained above. The top end of the last string assembled to the bottom pipe segment 1-1 of length L2+L0 carries a sheave 6-6 attached to a shaft secured to said string. Thereafter, laying is continued by assembling successive strings. When said sheave 5b-1 is at a depth H1 of 25 m to 50 m, the ROV 12 connects the bottom end of a cable 5 to the gusset 5a, then passes said cable 5 over the sheave 6-6, with the second end 5-1 of the cable being connected to a deadman 6-1 lowered from the ship 2, the deadman 6-1 naturally hanging close to said pipe 1, without interfering therewith.

As shown in FIG. 1B, laying is then continued towards the sea bottom 20, and is then stopped at a height H0 of about 20 m to 25 m from said sea bottom. By means of its high-power thrusters, the ROV 12 then exerts horizontal thrust on the bottom end 1c of the pipe, which thrust is directed to the left in the direction XX', i.e. in the plane XoZ.

Figure 1C:
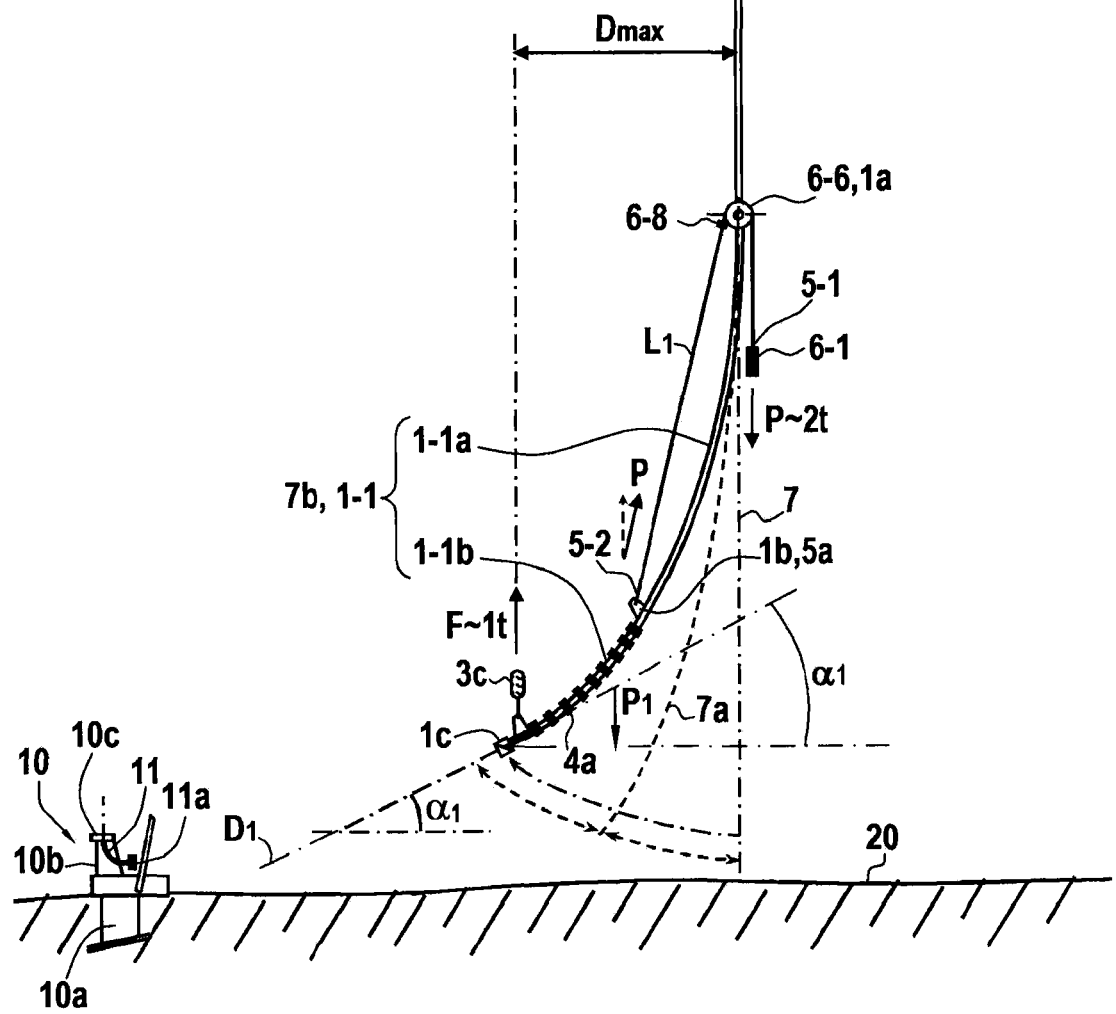

FIG. 1C shows the result of this thrust. Initially, the axis 7 of the pipe 1 coincides substantially with the vertical axis ZZ. Then as soon as sufficient thrust is exerted horizontally to the left against its bottom end 1c, the bottom segment 1-1 of the pipe takes up a curved shape 7a since the moment that results from the force F created by the float 3c, plus the moment of the force P created by the cable 5 tensioned by the deadman 6-1 is greater than the resultant of the opposing moment created by the apparent weight P1 of the first pipe portion 1-1a of length L0 extending between the sheave 6-6 and the second gusset 5a plus the downward return movement due to the stiffness of the curved pipe portion, which moment opposes said curving by acting like a string blade.

It should be observed that the terminal portion 1-1b of length L2 of the pipe extending between the gusset 5a and the automatic connector at its bottom end 1c is provided with float elements 4a that ensure that its apparent weight in water is zero. Thus, this weight is not involved in balancing the moments.

So long as the ROV 12 does not thrust sufficiently to reach the shape of an intermediate curve 7a referred to as the "tipping position", if its stops thrusting the pipe will return towards its initial vertical position 7 since the resultant of the moment of the forces is positive, i.e. it is counterclockwise.

Thus, the resultant of the moment is:
positive but variable between the vertical position 7 and the tipping position corresponding to the curve 7a;
zero in the vertical position corresponding to the straight line 7; and
zero in the tipping position corresponding to the curve 7a.

The vertical position 7 corresponds to a stable configuration, whereas the position 7a corresponds to an unstable configuration. Beyond the curve 7a, the moment of the resultant of the forces becomes negative and the curvature of the pipe increases, as does the absolute value of the moment of the forces, in order to reach the final configuration 7b. The blocking cleat 6-8 preinstalled on the cable 5 comes into abutment at the inlet to the sheave 6-6 against a device (not shown) in such a manner that the chord of length L1 of the cable sub-tends an arc of pipe of curvature that does not exceed the maximum curvature that can be accepted by said steel pipe. Thus, as soon as the curvature of the pipe reaches the configuration of the curve 7b, only the float 3c gives rise to a small increase in the moment of the forces, but said float 3c is advantageously dimensioned so as to be incapable on its own of varying the curvature of the pipe. The values of L0 and L1 are advantageously adjusted so that the maximum curvature 7b of the pipe is such that the maximum stress generated by the curvature remains below the elastic limit, e.g. less than 90% or less than 95% of the elastic limit. The term "elastic limit" is used herein to mean the stress beyond which the deformation of the pipe becomes irreversible, which leads to irreversible plastic deformation of the steel that then runs the risk of the pipe kinking and thus being destroyed.

Between the vertical position 7 and the configuration 7a, the main purpose of the float 3c is to assist the ROV in reaching said tipping position 7a. Beyond the position 7a, the essential driving element is the deadman 6-1 acting via the cable 5 until the blocking cleat 6-8d prevents any further increase in the absolute value of the resultant moment (a negative moment).

In the absence of the blocking cleat 6-8, the elastic limit of the steel would inevitably be exceeded and the pipe would then be kinked at a point situated between the second gusset 5a and the sheave 6-6, generally close to said second gusset 5a, since it is in that zone that the radius of curvature is at a minimum, and thus the curvature and the stress in the steel is at a maximum.

Depending on the dimensioning of the float 3c, of the deadman 6-1, on the length L0 relative to the apparent weight, and on the stiffness of the pipe 1, it is advantageous to adjust the position of the tipping curve 6a:
either by bringing it closer to the position 7 corresponding substantially to the vertical, e.g. by increasing the buoyancy of the buoy 3c, or indeed by increasing the weight of the deadman 5c-1, or even by combining both increases;
or else moving it closer to the desired final position 7b, e.g. by reducing the buoyancy of the buoy 3c, or by reducing the weight of the deadman 6-1, or indeed by combining both reductions.

When the equilibrium configuration 7a is very close to the vertical, it suffices for the ROV 12 to give a small horizontal impulse so that the assembly tips immediately after a few seconds into the position 7b.

This situation should be avoided since the assembly then runs the risk of tipping suddenly and in uncontrolled manner as soon as the deadman is installed, i.e. while in the configuration described with reference to FIG. 1A, and thus close to the surface, whereas the sea bottom lies at 1500 m or 2000 m lower down, or even further down.

When such instability is desired in order to minimize the horizontal triggering force that needs to be created by the ROV, it is advantageous to install a first device for preventing the sheave 6-6 from rotating relative to the pipe (device not shown), and a second device for blocking the cable 5 relative to said sheave 6-6 (device not shown). Thus, with the sheave 6-6 and the cable 5 blocked in this way during the descent stage, the pipe remains in a substantially vertical position and the deadman 6-1 has no influence. On arriving close to the sea bottom, the ROV 12 releases the blocking of the cable 5 and the blocking of the sheave 6-1, and with the slightest instability of the ship or in the event of a significant deep sea current to the left, the bottom portion of the pipe then takes on the curvature of the configuration 7b shown in FIG. 1C in a few seconds. Nevertheless, it should be observed that in the event of a strong current to the right, the pipe runs the risk of curving in the same XoZ plane, but in the opposite direction, which would be detrimental to the subsequent operations.

FIG. 4 is a side view showing the main stages of installing the end 1c of the pipe 1 fitted with a connector to a base 10 secured to the sea bottom. The base 10 is constituted by a pile 10a embedded in the sea bottom 20 and carrying a structure 10b on which there is rigidly installed a support 10c for a riser type bottom-to-surface connection pipe (not shown), said support including a pipe bend element 11 with the female or male portion 11a of an automatic connector installed at the end thereof that is complementary to the male or female portion respectively of the automatic connector installed at the end 1c of the pipe 1. Two guide elements 10e of butterfly-wing shape are secured to the structure 10b for the function of guiding the end 1a of the pipe 1 as it approaches the base 10.

In the position M0, the top portion of the pipe 1 is substantially vertical and its bottom portion has been put into the J-curved configuration 7b, as explained above. The curved pipe lies in the XoZ plane and is free from any horizontal traction stress. The ship then takes up a position so that the ZoX plane containing said curved pipe 1 also contains the axis of the base 10 and of its pile 10a.

The ship reverses and approaches the base structure 10 at the sea bottom going towards the position M1 until the connector at the bottom end 1a is positioned vertically relative to the two butterfly-wing guides 10e. Thereafter, the pipe is lowered towards the base 10 if necessary by adding an additional string 2-1 at the J-lay tower. This operation is very tricky and is performed while being monitored by the ROV 12, and with its help. When the automatic connector at the end 1c of the pipe 1 is pressed against the bottom portions of the guides 10e, close to the corresponding portion of the stationary automatic connector 11a, the ship advances, i.e. moves in the opposite direction away from said base structure 10 going towards the position M2 while continuing to assemble the strings needed to obtain an angle of inclination β of the pipe at the surface, which angle is preferably less than 10°, corresponding to a substantially horizontal position for the terminal portion 1-1b of the pipe 1 at its bottom end 1c including a said automatic connector. The two connector elements 1c and 11a are then facing each other and can be assembled together by a device, e.g. a hydraulic device that is not shown, and then locked together by means of the ROV 12 under control from the surface.

The installation ship 2 continues laying, moving away from the base 10 on the sea bottom 20 towards the position M3, in which position the deadman 6-1 touches the ground. The deadman 6-1 advantageously has a streamlined shape as shown in FIG. 4B so as to present a bullet or pointed shape 6-1a at its bottom portion and a similar shape 6-1b at its top portion. Thus, on reaching the ground, it penetrates vertically into the sea bottom 20 and remains in a vertical position. Once the deadman has penetrated into the ground, the tension in the cable 5 drops to zero, and the pipe that was curved because of said tension P in said cable 5 returns progressively to a substantially rectilinear configuration as a result of the stiffness of said pipe and as laying continues as represented by the position M4 in FIG. 4. Since the top portion of the deadman 6-1 has a conical shape 6-1b, there is no danger of the pipe becoming blocked on the top of the deadman as laying continues, since the pipe slides down its side to the ground.

Installations of the above type are described in prior patent applications WO 2002/066786 and WO 2003/095788.

FIGS. 2A-2B show a variant in which the end float 3c of the FIG. 1C is eliminated, but this absence of a float is compensated by increasing the weight of the deadman 6-1, and increasing the distance $D_0$ from the axis of the pipe of the point where the end 5-2 of the cable 5 is fastened to the second gusset 5a. The length L2 of the terminal portion 1-1b of the pipe is still provided with coaxial float elements 4a in order to give it neutral buoyancy in water, with a terminal float element 4a-1 compensating the weight of the automatic connector. The process remains identical, but the trigger threshold is modified as a function of the weight of the deadman 6-1, of the value of the offset $D_0$, and also of the length L0 between the sheave 6-6 and the second gusset 5a. The absence of an end float 3c means that when the pipe becomes curved as shown in FIG. 2B, the length L2 remains rectilinear. This configuration is advantageous, since it does not require the float 3c of the variant described with reference to FIGS. 1A-1C to be removed, where such removal is tricky and expensive in terms of the length of time during which the installation ship is in use.

In the embodiments of FIGS. 1C and 2B, said first float elements 4a in the terminal pipe portion 1-1b of said second float element 3c at the bottom end 1c, enable the angle $\alpha_1$ of the tangent D1 to said pipe at its bottom end 1c to remain below 45°, while said first pipe portion 1-1a is itself maximally curved so that the cable reaches the chord of limit value L1. This position suffices for it to be possible subsequently, after the bottom end 1c has been connected to the complementary connection element 11a at the sea bottom, to obtain a J-shaped curve by lowering additional pipes from the surface and laying the bottom pipe segment 1-1 progressively on the sea bottom as the ship moves away and continues laying by lowering more pipe.

The invention is described above with a deadman 6-1 for tensioning the cable 5, however said tension may be created equally well by replacing said deadman by a float 6-2 of identical capacity. Nevertheless, the sheave system nevertheless then needs to be modified so that it holds the cable captive. Unfortunately, this version as shown in FIG. 2C presents the drawback of requiring said buoy 6-6 to be disconnected at the end of installation, so it does not constitute a preferred version of the invention. Thus, the cable guide means 5 then include a second sheave 6-7 about which said cable passes so that the float element 6-2 can tension the end 5-2 of said cable upwards, thereby tensioning the chord of limiting length L1 of the cable 5 between the second gusset 5a and the first sheave 6-6.

Furthermore, in FIG. 2C, the terminal portion 1-1b of the pipe, having its bottom end 1c including an automatic connector type coupling element, does not co-operate with and does not include a float element. Under such circumstances, the terminal pipe portion 1-1b between the bottom end 1c and the fastening point 1b does not necessarily adopt a curved shape with an angle $\alpha_1$ of less than 45° for the tangent D1 to the pipe at its bottom end 1c, however the curvature of the first pipe portion 1-1a obtained by tensioning the cable 5 nevertheless enables curvature to be obtained such that the angle $\alpha_2$ of the tangent D2 to the pipe at its fastening point 1b for the gusset appears to be less than 45°.

FIGS. 3A-3B show a preferred variant of the invention in which, between the second gusset 5a and the sheave 6-6, there are installed both buoyancy distributed over the terminal portion 1-1b of the pipe 1 by means of coaxial peripheral buoyancy elements 4a that are regularly spaced apart so as to confer on said terminal pipe portion 1-1b an apparent weight in water of zero, and also buoyancy distributed over a fraction of length L3 of the first pipe portion 1-1a extending upstream from said second gusset 5a in the form of buoyancy elements 4b giving a resultant buoyancy to said pipe length L3 that is positive, representing 20% to 200% of the weight of the fraction of length L3 of said first pipe portion 1-1a. This positive buoyancy performs a role of the same type as that performed by the float 3c of FIG. 1C, but gives rise to a moment that is smaller since the mean lever arm Da is shorter. This embodiment is advantageous since the buoyancy elements 4b imparting this additional buoyancy to the pipe are directly associated therewith and can remain in place, not requiring any removal at the end of installation. In this preferred version, the pipe portion L2 remains rectilinear since the weight of the pipe is compensated by the buoyancy element 4a, 4b, 4a-1 installed along the terminal portion 1-1b of the pipe.

Multiple variants maybe envisaged for the positioning of the positive buoyancy, e.g. positive buoyancy over the entire length L2, or a float attached to the second gusset 5a, but under all circumstances said buoyancy on its own must not be sufficient to enable the curvature of the pipe to reach the position 7b, and even less to be capable of going beyond it in an upward direction, this configuration 7b being obtained by the deadman 6-1 of weight P acting on the cable 5, which configuration cannot be exceeded because of the blocking cleat 6-8 being blocked against the inlet of the sheave 6-6, thereby limiting the curvature of said pipe to an acceptable level of stress.

Figure 5:
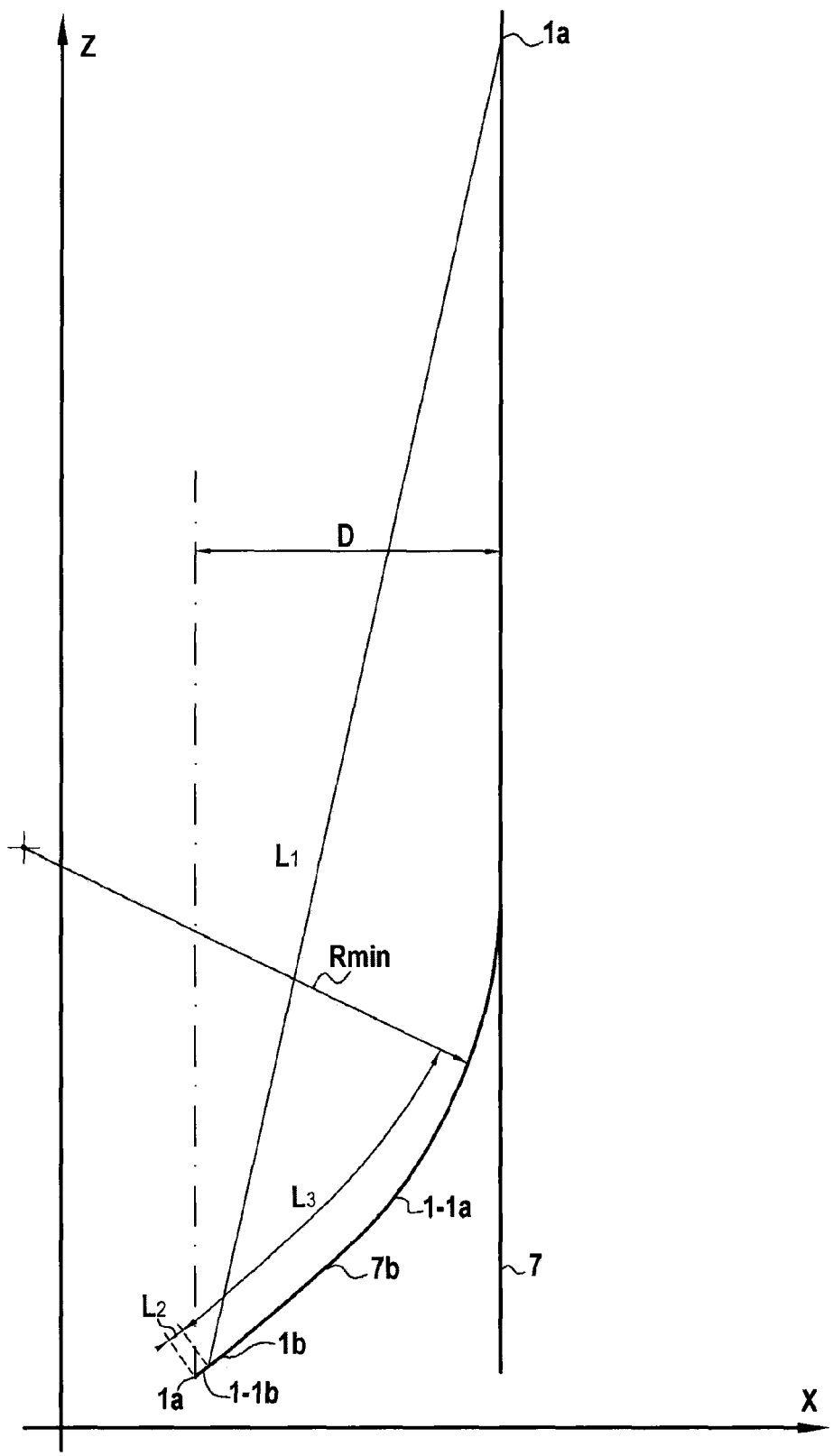
FIG. 5 is a graph resulting from dynamics calculations, showing the deformation of the pipe in a particular configuration.

FIG. 5 is a graph resulting from computer calculation of the curve 7b in a preferred version of the invention as shown in FIG. 3B, with buoyancy installed seeking to balance the weight of the pipe over the length L2 of the terminal portion 1-1b by means of buoyancy elements 4 (not shown in FIG. 5) and 4b over a fraction of length L3 of the first pipe portion 1-1a extending from said second gusset 5a, in the form of buoyancy elements 4b (not shown in FIG. 5) compensating the weight of the pipe. A buoyancy element 4a (not shown in FIG. 5) compensates the weight of the end connector 1c (not shown in FIG. 5). This curve was obtained by calculation on the basis of a steel pipe having an outside diameter of 323.9 millimeters (mm) and a thickness of 17.5 mm, weighing 132.23 kilograms per meter (kg/m) in air. The distance L0 between the gusset 5a and the sheave 6-6 is L0=500 m, the distance of the blocking cleat 6-8 from the gusset 5a is L1=492 m, and the weight of the deadman 6-1 is P=2 (metric) tonnes (t). Buoyancy elements 4a seeking to compensate the weight of the pipe are installed on the terminal portion 1-1b of length L2=12 m and over a length L3=150 m of the first pipe portion 1-1a. The minimum radius of curvature of the resulting curve 7b lies at the transition between the pipe fitted with the buoyancy elements 4b and the pipe upstream that does not have said buoyancy elements: Rmin≈156 m, which corresponds to a maximum stress of 215 megapascals (MPa). The distance D between the pipe end 1c and the initial vertical position is about 100 m, giving the curve great flexibility and making it very easy for the ROV to manipulate. Thus, the operation of laying the connector and connecting the pipe to its receptacle 10 or base structure 10 at the sea bottom can be performed under excellent conditions of safety.

By way of example and with reference to FIG. 1C, at a depth of 1500 m underwater, for installing a pipe having an outside diameter of 323.9 mm and a thickness of 17.5 mm, weighing 132.23 kg/m in air, buoyancy elements 4a are installed so as to make the weight of the pipe neutral in water over a length L2=24 m. The end float 3c exerts a vertical thrust of 1.4 t. The distance L0 between the gusset 5a and the sheave 6-6 is L0=500 m, the distance of the blocking cleat 6-8 from the gusset 5a is L1=492 m, and the weight of the deadman 6-1 is P=2 t. The angle $\alpha_1$ of the final configuration of the curvature 7b is about $\alpha_1 \approx 40°\text{-}45°$.

By way of example with reference to FIG. 3B, at an underwater depth of 1500 m, in order to install a steel pipe having an outside diameter of 323.9 mm and a thickness of 17.5 mm, and weighing 132.23 kg/m in air, buoyancy elements are installed so as to make the weight of the pipe neutral in water over a length L2=24 m. Distributed buoyancy 4b is installed over a length L3=15 m having a value of 230 kg/m. The distance L0 between the second gusset 5a and the sheave 6-6 is L0=500 m, the distance of the blocking cleat 6-8 from the gusset 5a is L1=492 m, and the weight of the deadman 6-1 is P=2 t. The angle $\alpha_1$ of the final configuration of the curvature 7B is about $\alpha_1 \approx 40°\text{-}45°$.

In other variant embodiments, shown in FIGS. 6 and 7A-7B, said deadman 6-1 or said float 6-2 is replaced by a winch 6-3 or an actuator 6-4, which elements are powered and controlled by the ROV. Said winch 6-3 or said actuator 6-4 is preferably secured to the pipe at the first gusset 5a with the second end 5-1 of the cable 5 being fastened to a gusset 5d secured to the pipe 1 and located in the same position 1a as the sheave 6-6 as described above with reference to FIGS. 1 to 5. Thus, with a winch 6-3 as shown in FIG. 6, the blocking cleat 6-8 is beside the gusset 5a, at a distance L1 from the gusset 5d, and it becomes blocked at the inlet of the winch 6-3 when the winch winds the cable 5 so as to create the tension P that is designed to generate the curvature of the pipe.

For an actuator 6-4 as shown in FIGS. 7A-7B, the stroke of the rod 6-5 of said actuator advantageously corresponds to the difference $\Delta L = L0 - L1$, i.e. to a stroke of 8 m in the above-described example. FIG. 7A shows the pipe in a vertical position, the rod of the actuator 6-4 being deployed, and FIG. 7B shows the pipe in a curved position, the rod of the actuator 6-4 being in the retracted position. In order to shorten the stroke of said actuator, it is advantageous to use N-strand reeving of the cable, which means that it is necessary to use an actuator presenting load capacity that is greater than or equal to N×P, where P is the tension required for obtaining the desired curvature of the pipe.

The invention is described in the context of laying rigid pipes, however it is also most advantageous when laying flexible pipes, electric cables, and umbilicals.

Figure 8:
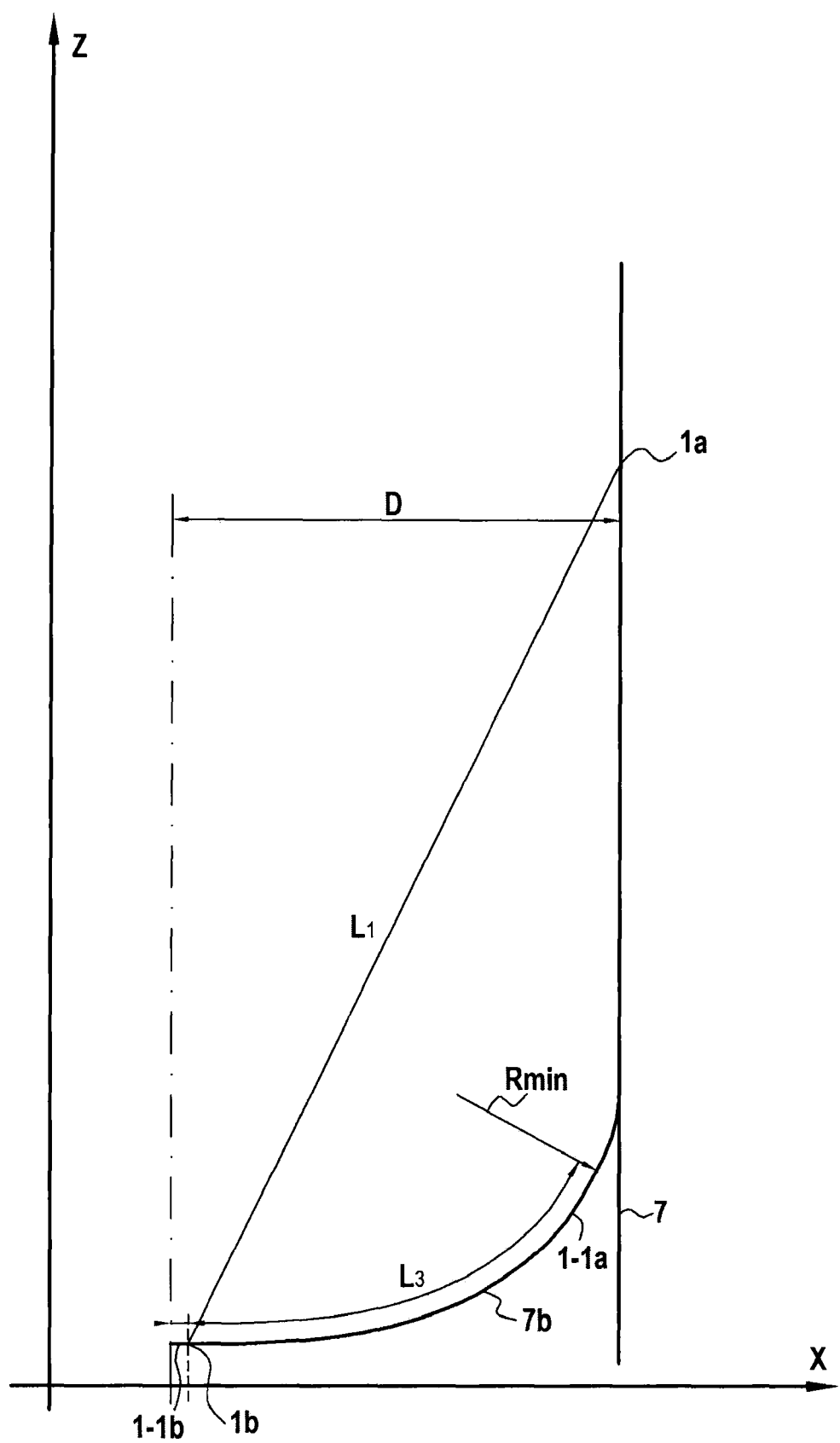
FIG. 8 is a graph resulting from dynamics calculations showing the deformation of the pipe in a particular configuration.

In order to clarify the drawings, the various lengths L0 to L4 and H0, H1 are not drawn to scale relative to one another, except in FIGS. 6 and 8 which are respective graphs resulting from calculating the mechanical equilibrium of the assembly.

The buoyancy elements 4a and 4b are preferably constituted by peripheral and coaxial buoys surrounding said pipe and regularly spaced apart from one another, in particular being made of syntactic foam.

In another embodiment, buoyancy may be constituted by a continuous coating of material having positive buoyancy, e.g. applied in the form of semi-tubular shells that are assembled together in pairs all around said pipe.

FIG. 8 is a graph resulting from computer calculation of the curve 7b in a preferred version of the invention, representing the variant of FIG. 5, in which buoyancy has been installed seeking to balance the weight of the pipe over the length L2 of the terminal portion 1-1b in the form of buoyancy elements 4a (not shown in FIG. 8) covering a fraction of length L3 of the first pipe portion 1-1a extending from said second gusset 5a, in the form of buoyancy elements 4b (not shown in FIG. 8) compensating the weight of the pipe. A buoyancy element 4a-1 (not shown in FIG. 8) compensates the weight of the end connector 1c (not shown in FIG. 8). This curve is obtained by calculation on the basis of a steel pipe having an outside diameter of 323.9 mm and thickness of 17.5 mm, and weighing 132.23 kg/m in air. The distance L0 between the gusset 5a and the sheave 6-6 is L0=500 m, the distance of the blocking cleat 6-8 from the gusset 5a is L1=415 m, and the weight of the deadman 6-1 is P=0.8 t. Buoyancy elements 4a seeking to compensate the weight of the pipe are installed on the terminal portion 1-1b of length L2=6 m and on a length L3=200 m of the first pipe portion 1-1a. The minimum radius of curvature of the resulting curve 7b is situated at the transition between the pipe fitted with buoyancy elements 4b and the pipe upstream therefrom, having no buoyancy elements: Rmin≈105 m, which corresponds to a maximum stress of 340 MPa. The distance D between the pipe end 1c and the initial vertical position is about 265 m, which gives great flexibility to the curve, making it very easy to manipulate by the ROV. Furthermore, the end of the pipe is practically horizontal, and the operation of placing the connector and of connecting the pipe to the receptacle 10 or base structure 10 at the sea bottom can be performed under excellent conditions of safety.

In order to further increase the flexibility of the device, the length L2 of the terminal portion is advantageously increased up to 20 m-30 m or even 50 m, this portion being of neutral buoyancy in water and remaining free and easy to move by means of the ROV. Nevertheless, its length must be limited depending on local currents, since even if said pipe remains neutral with respect to buoyancy, it is nevertheless subjected to ocean currents that may destabilize the device, particularly with lateral currents, i.e. along the axis YY perpendicular to the plane of FIG. 8.

The invention claimed is:

1. A method of laying an undersea line at the bottom of the sea from the surface in order to connect a bottom end of said undersea line to a coupling element at the sea bottom, wherein the following steps are performed:

1) said undersea line is positioned so as to be suspended from the surface in a substantially vertical position, the bottom end of said undersea line being situated at a height H0 above the sea bottom, said undersea line having in a bottom segment a curving device for curving a first portion of the undersea line extending between two points of said undersea line, said curving device consisting essentially of at least one cable and tensioning means for tensioning said cable between said two points of the undersea line, said undersea line being secured to said cable by directly fastening the at least one cable to the undersea line or by using guidance means in direct contact with said undersea line at these two said points, said tensioning means being suitable for moving said two points towards each other by reducing the length of the cable extending between the two points from a maximum length L0 to a minimum length having a shorter limit value L1 so as to create a curvature or increase an angle of the existing curvature of said bottom segment of said undersea line between said two points, said cable or said tensioning means comprising or co-operating with at least one blocking means suitable for preventing the reduction in the length of the cable tensioned between said two points below said minimum length L1, said two points being spaced apart by said maximum length L0 when said first undersea line portion is in a rectilinear position;

2) the bottom end of said undersea line is moved, so that the bottom end of said undersea line moves away from the initial position of step 1) in which said undersea line was in a vertical position, said tensioning means creating controlled curvature of said first undersea line portion by moving said two points towards each other, said curvature of the first undersea line portion being limited as the result of the reduction in the length of the part of the tensioned cable between said two points being incapable of going below said minimum length 3) the positioning of said bottom end of said undersea line is finalized relative to said coupling element at the sea bottom, and the bottom end of said undersea line is connected to said coupling element.

2. The method according to claim 1, wherein said tensioning means comprise at least one of the three following tensioning means:

a) a deadman or a buoyancy element fastened or connected to one end of said cable, said cable then being guided between the two ends of said cable by guide means secured to said line at one of said points that is a point for guiding said cable on said undersea line, the other end of said cable being fastened or connected to the other point which is a fastening point;

b) a winch fastened or connected to the undersea line at at least one of said two points, on which winch said cable can be wound from at least one of the ends of the cable whereby the cable is fastened to the winch; and c) an actuator fastened or connected to the undersea line at at least one of said two points, the actuator having an actuator rod having one end fastened or connected to at least one end of said cable, said actuator rod being incapable of moving through more than a maximum distance equal to L0−L1.

3. The method according to claim 1, wherein:

said cable is fastened at one end to a gusset secured to said undersea line at a said point defining said first portion and the terminal segment of the bottom portion of the undersea line, and said cable passes between the two ends of the cable via cable guide means secured to said undersea line at a point on said undersea line, the other end of said cable co-operating with tensioning elements comprising a buoyancy element or a weight or deadman, exerting a tension of magnitude P at said other end; and in step 2), the bottom end of said undersea line is moved so as to create controlled curvature of the first undersea line portion lying between said two points on the undersea line as a result:
  said tensioning elements exert a tension P of magnitude suitable for tensioning said cable and for curving said first undersea line portion when the bottom end of said undersea line is moved away from said initial position of step 1) in which said undersea line was in a vertical position; and
  said cable includes or co-operates with blocking means preventing the length of the part of the cable tensioned between the two points decreasing below a given limit value of said minimum length L0, thereby limiting the curvature of said first line portion between the two points as a result of said tensioning.

4. The method according to claim 1, wherein:
said undersea line is an undersea pipe of steel made up of strings assembled to one another by end-to-end welding while in position in a laying tower of a laying ship at the surface, from which said undersea pipe is laid on the sea bottom;
in step 2), the bottom end of said undersea line is moved with the help of a controlled undersea robot;
said curvature of said first undersea pipe portion between said two points being limited so that the radius of curvature of said pipe remains greater than a limit value corresponding to a maximum stress below the elastic limit of the steel of said first pipe portion;
in step 3), said undersea pipe in which said portion has a curved shape is moved by moving said laying ship closer to said coupling element on the sea bottom while also lowering an additional length of said undersea pipe from the laying ship on the surface; and, the positioning of said bottom end of the pipe is finalized relative to said coupling element situated at the end of another pipe supported by a structure anchored to the sea bottom, and said coupling element of the automatic connector type is connected to a complementary automatic connector coupling element situated at the bottom end of said pipe.

5. The method according to claim 4, wherein:
said strings are assembled by end-to-end welding two to four unit pipe elements each having a length of 5 m to 15 m, with outside pipe diameters lying in the range 50 mm to 600 mm;
the length of said terminal pipe portion corresponds to a length of one to ten unit pipe elements placed end-to-end in a straight line; and
the length of said first pipe portion in a rectilinear position lies in the range 150 to 1000 times the outside diameter of the pipe, corresponding to ⅕ to ½ of the depth of the undersea ground.

6. The method according to claim 4, wherein:
said guide means comprise at least one sheave of axis secured to said pipe; and
said blocking means are constituted by a blocking cleat secured to the cable and situated at a maximum length L1 from said point fastened to the winch when the pipe is rectilinear.

7. A method according to claim 4, wherein said pipe includes or co-operates with first buoyancy elements at said terminal pipe portion between said point and the bottom end of the pipe in such a manner as to compensate at least the apparent weight in water of said terminal pipe portion, said first buoyancy elements distributed along said terminal portion.

8. The method according to claim 7, wherein said pipe further includes or co-operates with additional buoyancy elements suitable for creating positive buoyancy over a fraction of said pipe bottom segment, said positive buoyancy F not being capable, by itself, of causing said first pipe portion to curve in the absence of said tensioning P of the cable with the help of said tensioning means, or of increasing said curvature in the presence of said tensioning P with the help of said tensioning means.

9. The method according to claim 8, wherein the pipe includes said additional buoyancy elements suitable for creating positive buoyancy distributed along a fraction of the length of said first pipe portion extending from said point defining said first and terminal pipe portions, said positive buoyancy not being capable, by itself, of generating or increasing curvature of said first pipe portion in the absence of, or respectively in the presence of said tensioning P of the cable at said point which is a point for guiding said cable on said undersea line.

10. The method according to claim 8, wherein said pipe also includes or co-operates with a second additional buoyancy element co-operating with the bottom end of the pipe and suitable for creating positive buoyancy of the terminal pipe portion in combination with first buoyancy elements extending substantially over the entire length of the terminal pipe portion, said positive buoyancy being capable, by itself, of generating curvature of said terminal pipe portion, but said positive buoyancy is not capable, by itself, of generating or increasing the curvature of said first pipe portion in the absence of said tensioning P of the cable at said guide point.

11. The method according to claim 4, wherein, after step 3), the pipe continues to be laid on the sea bottom by performing the following additional steps:
  5) progressively moving the laying ship away from said structure anchored on the sea bottom through a length greater than the length of each additional string that is lowered from the laying tower, so as to create an angle of inclination β for the pipe at the surface that is not more than 10° relative to a vertical position, and then
  6) continuing to lower new additional strings while simultaneously moving the ship away from said structure anchored on the sea bottom through a length substantially equal to the length of each said additional string, the strings being lowered in such a manner as to conserve a said angle of inclination β for the pipe at the surface that is substantially unchanged.

12. The method of laying a pipe according to claim 1, wherein said tensioning means is constituted by a deadman or weight fastened to one end of said cable, the bottom portion of the deadman or weight being of streamlined shape, so as to enable it to penetrate into the ground when, during laying of the pipe, it comes into contact therewith, and a top portion of the deadman or weight also being streamlined, for preventing said pipe to remain blocked on top of said deadman, which would prevent the pipe from being laid horizontally on the seabed, after said bottom portion of the deadman has penetrated into the ground.

13. An undersea pipe being laid by the method according to claim 4, wherein the pipe includes said curving device for curving said first undersea pipe portion extending between two said points, said curving device comprising said at least one cable and tensioning means for tensioning said cable between said two points, said cable or said tensioning means including or co-operating with said at least one blocking means, said two points being spaced apart by a maximum length L when said first line portion is in a rectilinear position.

14. The pipe according to claim 13, wherein said cable is fastened at one end to a first gusset secured to said undersea pipe at a said fastening point, said fastening point being situated at a distance L2 from the bottom end of the undersea pipe when the terminal portion of the undersea pipe extending between said bottom end and said fastening point is rectilinear, and said cable passes via cable guide means secured to said undersea pipe at a guide point, said guide point being situated at a distance L0 from said fastening point when said first portion of the undersea pipe extending between said guide point and said fastening point is rectilinear, and said cable co-operating with tensioning means including a buoyancy element or a weight or deadman co-operating with the other end of said cable, and exerting thereon tension of magnitude P.

15. The pipe according to claim 13, wherein the pipe includes or co-operates with buoyancy elements at a said terminal pipe portion, said buoyancy elements being constituted by peripheral and coaxial buoyancy elements in the form of buoys that are regularly spaced apart from one another so as to compensate at least for the apparent weight in water of said terminal pipe portion of length L2, and buoyancy elements being suitable for creating positive buoyancy over a fraction of length L3 of said first pipe portion extending from a said point defining the terminal and first pipe portions, said positive buoyancy being incapable, by itself, of giving rise to or increasing the curvature of said first pipe portion in the absence or respectively in the presence of said tensioning P of the cable with the help of said tensioning means.

* * * * *